United States Patent [19]

Yoshida

[11] Patent Number: 4,982,425
[45] Date of Patent: Jan. 1, 1991

[54] HANDS-FREE TELEPHONE

[75] Inventor: Ikio Yoshida, Tokyo, Japan

[73] Assignee: NEC Corporation, Tokyo, Japan

[21] Appl. No.: 313,209

[22] Filed: Feb. 21, 1989

[30] Foreign Application Priority Data

Feb. 18, 1988 [JP] Japan .................................. 63-33902
Oct. 7, 1988 [JP] Japan ................................ 63-252046

[51] Int. Cl.$^5$ ............................................ H04M 9/08
[52] U.S. Cl. .................................... 379/390; 379/388; 379/58
[58] Field of Search .................. 379/388, 389, 390, 58, 379/61, 63

[56] References Cited

U.S. PATENT DOCUMENTS 4,731,811  3/1988  Dubus .................................... 379/58
4,737,976  4/1988  Borth et al. ........................... 379/58

Primary Examiner—Jin F. Ng
Assistant Examiner—M. Shehata
Attorney, Agent, or Firm—Sughrue, Mion, Zinn, Macpeak & Seas

[57] ABSTRACT

In order to perform voice-switched telephoning, a hands-free telephone includes a speaker, a microphone, a receive variable attenuator (R-ATT), a transmit variable attenuator (T-ATT), a receive signal detector, a transmit signal detector and an attenuation control circuit. The telephone also includes an auxiliary control circuit which prevents the output of the transmit signal detector from reaching the attenuation control circuit during a transient period between a call origination and the beginning of a conversation. During the transient period, only the speaker is enabled to output a ringback tone therethrough. When the output level of the transmit signal detector exceeds a predetermined level, the auxiliary control circuit passes the output of the transmit signal detector to the attenuation control circuit to start the voice-switched telephoning. Once the auxiliary control circuit passes the output of the transmit signal detector, it holds this state until the conversation finishes.

4 Claims, 5 Drawing Sheets

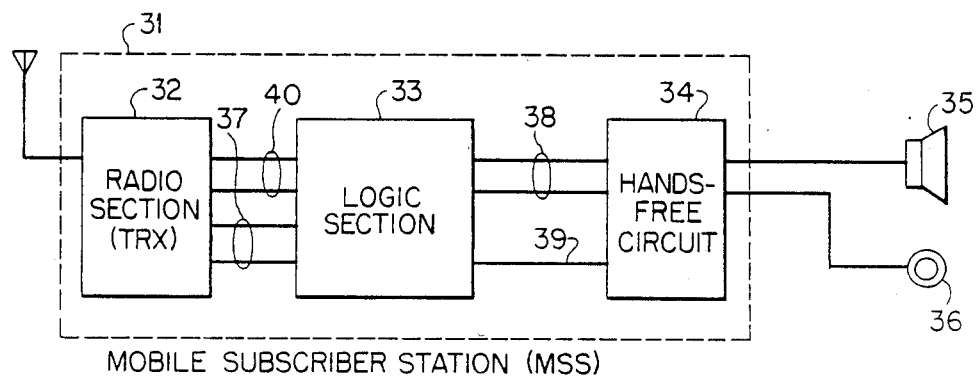
FIG. 4
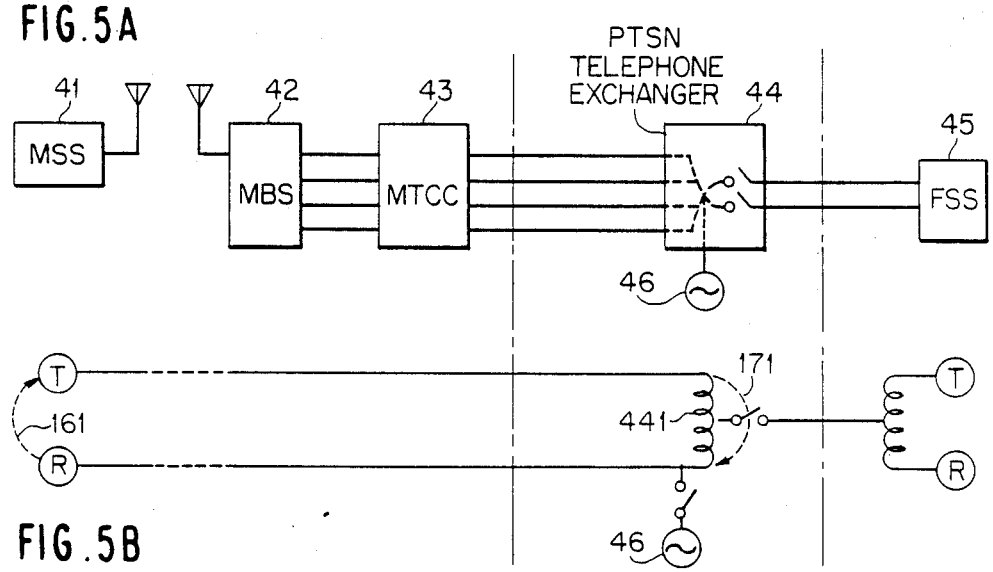
FIG. 5A
FIG. 5B

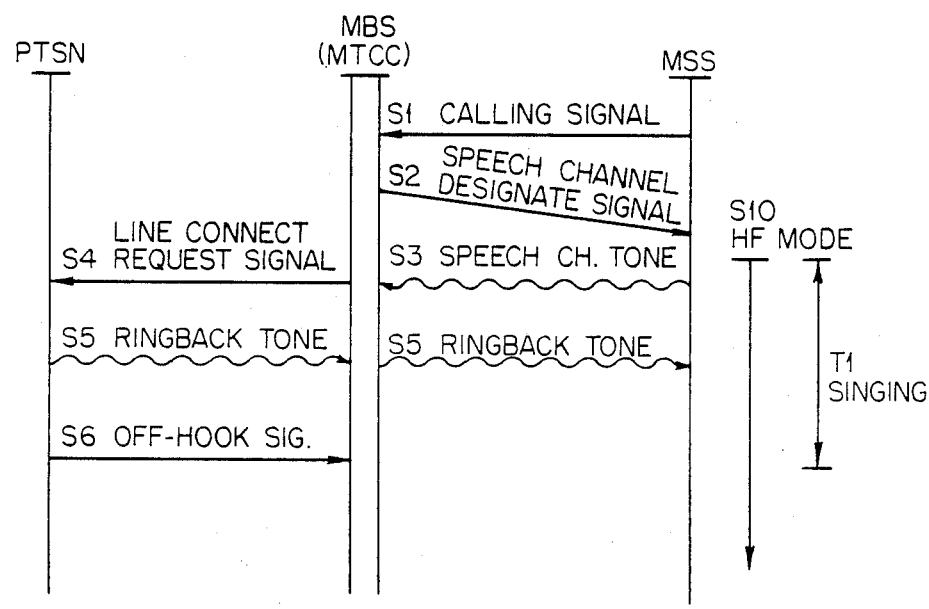
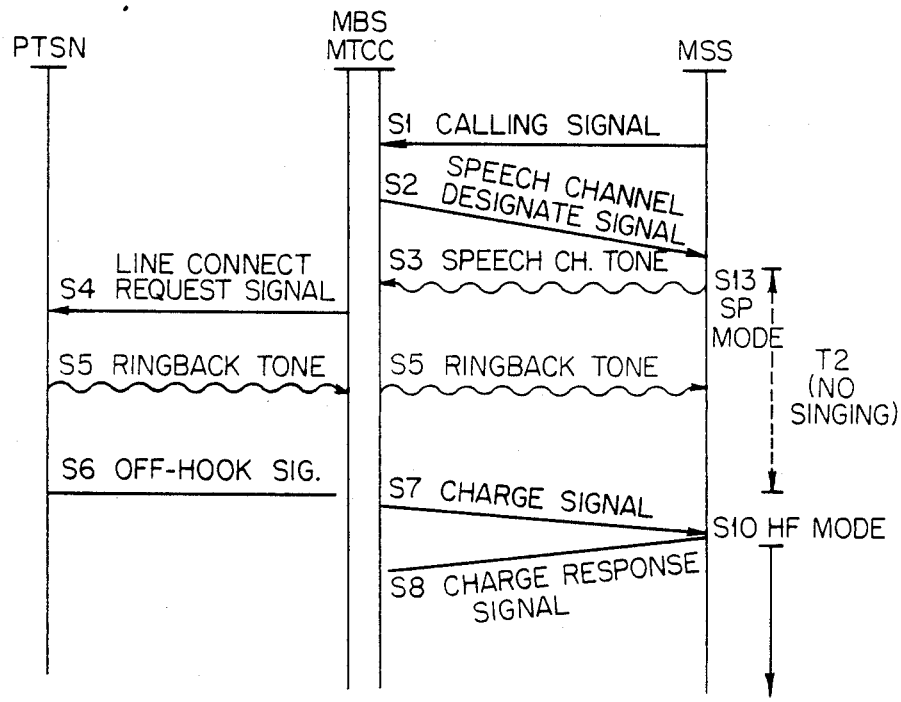

HANDS-FREE TELEPHONE

BACKGROUND OF THE INVENTION

The present invention relates to a hands-free telephone and, more particularly, to a voice-switched type hands-free telephone which may be used for a mobile telephone system.

A hands-free telephone has a howling or singing problem. A voice-switched speakerphone is an answer to the singing problem. Reference is made to "Fundamental Considerations in the Design of a Voice-Switched Speakerphone," by A. Busala, *THE BELL SYSTEM TECHNICAL JOURNAL*, Volume XXXIX, No. 2, Mar., 1960. To avoid the singing, the voice-switched speakerphone, which will later be described referring to FIG. 1 of the accompanying drawings, includes a receive variable attenuator, or variolosser, inserted into a receive path and a transmit variable attenuator, or variolosser, inserted into a transmit path. The voice-switched speakerphone also includes an attenuation control circuit which controls the attenuation of the receive and transmit variolossers in response to the signal levels of the receive and transmit paths.

More specifically, when the output level of microphone is smaller than the input level of speaker, the attenuation control circuit causes the receive variolosser to decrease its attenuation while causing the transmit variolosser to increase its attenuation. When the output level of microphone is larger than the input level of speaker, the attenuation control circuit causes the receive variolosser to increase its attenuation while causing the transmit variolosser to decrease its attenuation. Thus, the voice-switched speakerphone can alleviate the singing during the conversation.

However, the voice-switched speakerphone still has the singing problem during a transient period from the origination of a call to the beginning of the conversation. This may be caused by unbalance of a hybrid transformer of a telephone exchanger. The unbalance increases coupling between a transmit signal and a receive signal. The increasing of the coupling induces the singing at the speakerphone.

In the mobile telephone system, a mobile base station to be connected to a mobile subscriber station is almost always changed when a call is placed from the mobile subscriber station. That is, a communications line to be connected to the mobile subscriber station is changed, resulting in changes in the coupling between the receive and transmit signals. This aggravates the singing problem during the transient prior mentioned above.

SUMMARY OF THE INVENTION

An object of the present invention is, therefore, to provide a generally improved hands-free telephone which eliminates the above-mentioned singing problem.

Another object of the present invention is to provide a hands-free telephone which is used for a mobile telephone system and eliminates the singing problem, especially during a transient period from the call origination to the conversation.

According to one aspect of the present invention, there is provided a hands-free telephone comprising a speaker, a microphone, a receive variable attenuator (R-ATT), a transmit variable attenuator (T-ATT), a receive signal detector, a transmit signal detector and an attenuation control circuit in order to perform voice-switched telephoning. The telephone also comprises an auxiliary control circuit which prevents the output of the transmit signal detector from reaching the attenuation control circuit during a transient period between a call origination and the conversation. During this period, only the speaker is enabled to output a ringback tone therethrough. When the output level of the transmit signal detector exceeds a predetermined level, the auxiliary control circuit passes the output of the transmit signal detector to the attenuation control circuit to start the voice-switched telephoning. Once the auxiliary control circuit passes the output of the transmit signal detector, the auxiliary control circuit holds this state until the conversation finishes.

According to another aspect of the present invention, there is provided a hands-free mobile subscriber station (MSS) used for a mobile telephone system which comprises at least one mobile base station (MBS) connected to MSS over a radio channel and to an exchanger of a public telephone switching network (PTSN). The MSS comprises a radio transmitter/receiver section, a logic section connected to the radio transmitter/receiver section, a speaker and a microphone. The MSS further comprises a hands-free circuit connected to the logic section, the speaker and the microphone. The hands-free circuit performs voice-switched telephoning during the conversation and provides a receive signal from the logic section to the speaker and no transmit signal from the microphone to the logic section during a transient period from a call origination to the beginning of the conversation.

BRIEF DESCRIPTION OF THE DRAWINGS

The above and other objects, features and advantages of the present invention will become more apparent from the following description with reference to the accompanying drawings, in which:

FIG. 4 is a block diagram showing another embodiment of a hands-free telephone according to the present invention;

FIGS. 5A and 5B show schematic block diagrams of a mobile telephone system connected to a public telephone switching network (PTSN);

FIG. 6 is a flow chart showing the operation of the prior art mobile telephone system;

FIG. 7 is a flow chart showing the operation of the mobile telephone system according to the present invention.

DETAILED DESCRIPTION OF THE PREFERRED EMBODIMENTS

Figure 1:
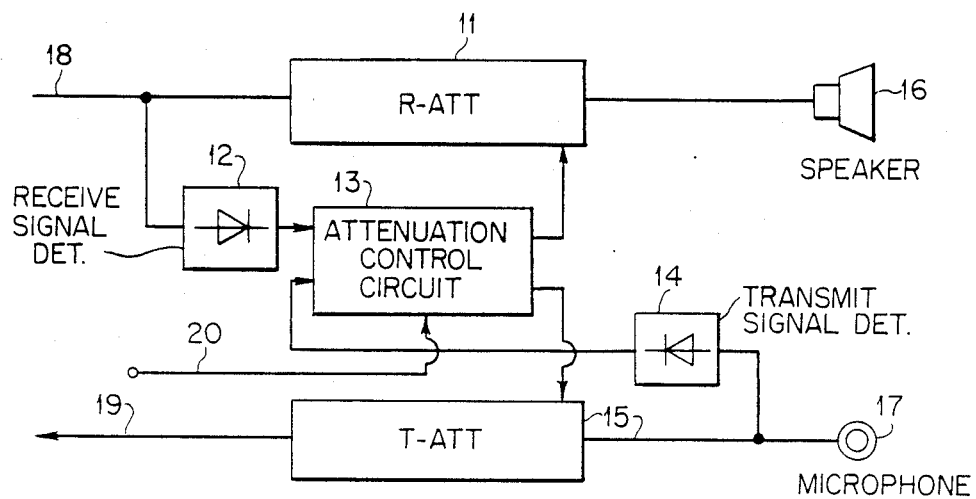
FIG. 1 is a block diagram showing a prior art hands-free telephone.

In FIG. 1, the conventional hands-free telephone includes a speaker 16 and a microphone 17 which may be connected to a public telephone switching network (PTSN) or to a logic circuit of a mobile subscriber station through a voice receive path 18 and a voice transmit path 19. Into the receive path 18 is inserted a receive variable attenuator, or variolosser, (R-ATT) 11. Similarly, a transmit variolosser (T-ATT) 15 is inserted into the transmit path 19. The R-ATT 11 and T-ATT 15 are under control of an attenuation control circuit 13. The attenuation control circuit 13 receives two signals indicating a receive voice level and a transmit voice level which are detected by detectors 12 and 14, respectively. The control circuit 13 also receives through a line 20 an enable or disable signal indicating whether a communications line between the hands-free telephone and PTSN is established. When the communications line is established, the control circuit 13 is enabled with the enable signal. Otherwise, the control circuit 13 is disabled with the disable signal.

When the receive signal detector 12 detects a receive voice signal and the transmit signal detector 14 detects no transmit voice signal, the control circuit 13 causes R-ATT 11 to decrease its attenuation while causing T-ATT 15 to increase its attenuation. On the contrary, when the detector 14 detects a transmit voice signal and the detector 12 detects no receive voice signal, the control circuit 13 causes T-ATT 15 to decrease its attenuation while causing R-ATT 11 to increase its attenuation. Thus, voice-switched telephoning can be performed, resulting in alleviating the singing during the conversation. (Since the detailed description of the voice-switched speakerphone is given in the Busala paper, it will be omitted herein.)

As mentioned earlier, however, the voice-switched speakerphone still has the singing problem during the transient period from a call origination to the beginning of the conversation. This singing problem can be solved by the present invention which will now be described.

Figure 2:
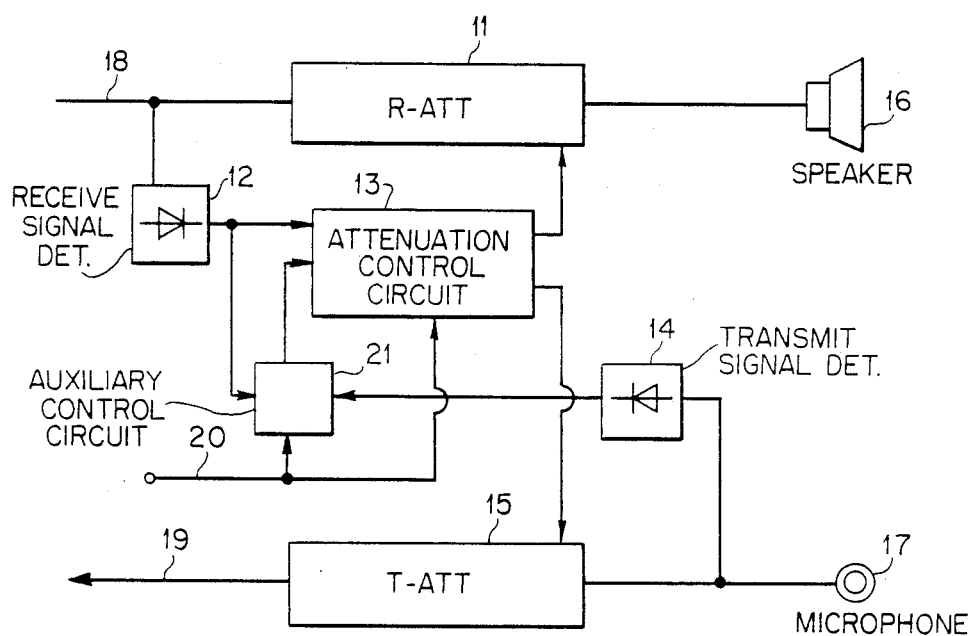
FIG. 2 is a block diagram showing an embodiment of a hands-free telephone according to the present invention.

In FIG. 2, a first embodiment of the present invention is shown in which the same reference numerals as in FIG. 1 denote the same elements as those in FIG. 1, respectively. After the conversation has started, the operation of the hands-free telephone of FIG. 2 is the same as that of the telephone of FIG. 1. The Busala paper is therefore incorporated in this application.

The hands-free telephone of FIG. 2 comprises an auxiliary control circuit 21 to which the outputs of the detectors 12 and 14 and the enable/disable signal on line 20 are applied. Through the auxiliary control circuit 21, the output of transmit signal detector 14 is applied to the attenuation control circuit 13. The auxiliary control circuit 21 receives the output of receive signal detector 12 and the enable/disable signal. Based on these signals and on the output of transmit signal detector 14, the circuit 21 determines whether or not the output of transmit signal detector 14 is to be passed to the attenuation control circuit 13.

More specifically, if the output level of transmit signal detector 14 exceeds a predetermined reference level that is determined by the output level of receive signal detector 12, the auxiliary control circuit 21 passes the output of detector 14 to the control circuit 13 and then holds this state until the circuit 21 receives the disable signal. In other words, the auxiliary control circuit 21 detects that a voice signal is applied to the microphone 17 to start the conversation. Thereafter, the attenuation control circuit 13 performs the voice-switched operation like the prior art telephone does. Since the transmit signal is not transmitted during the transient period, no singing occurs during this period.

Figure 3:
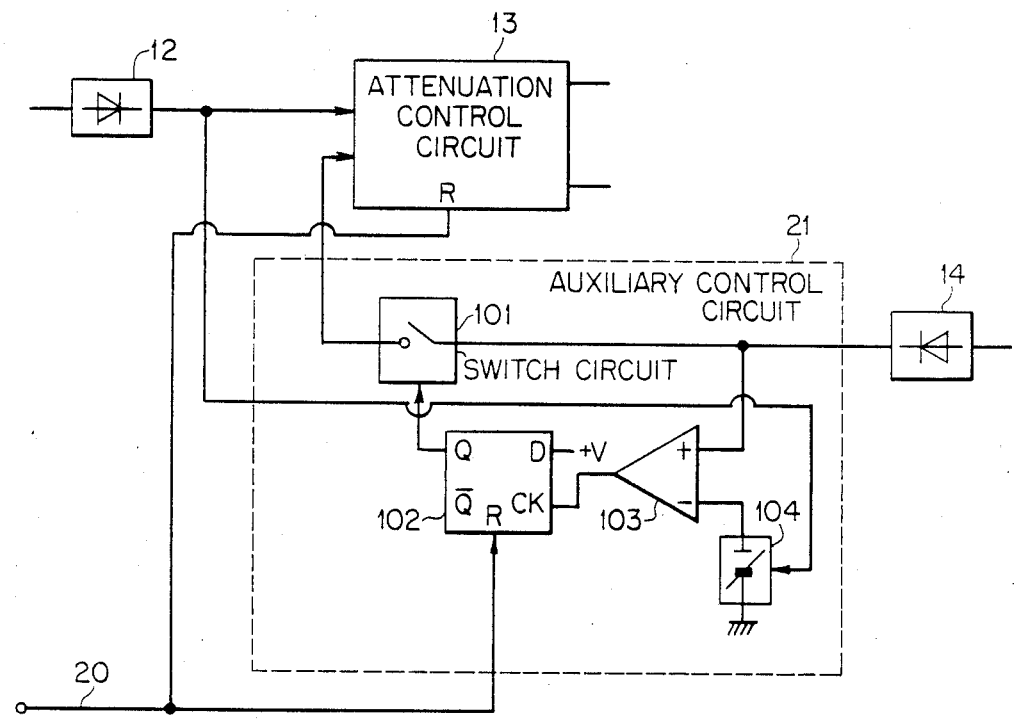
FIG. 3 is a block diagram showing an auxiliary control circuit in the telephone of FIG. 2.

Referring to FIG. 3, the auxiliary control circuit 21 comprises on analog switch 101 connected between the signal detector 14 and the attenuation control circuit 13. The circuit 21 also comprises a comparator 103 whose non-inverting and inverting terminals are supplied with the output of signal detector 14 and the output of a reference signal generator 104, respectively. The reference signal generator 104 sets its output voltage to the predetermined reference level in accordance with the output level of receive signal detector 12. The output of comparator 103 is applied to a clock terminal CK of a flip-flop (F/F) 102. The data terminal D and the reset terminal R of F/F 102 are applied with a positive voltage +V and the enable/disable signal, respectively. The Q output of F/F 102 controls the analog switch 101.

When the enable signal is applied to the reset terminal R of F/F 102, i.e., the communications line is established, the analog switch 101 is made open by the Q output of F/F 102. As long as the output of signal detector 14 is below the predetermined reference level, the analog switch 101 is open. If the output level of signal detector 14 exceeds the predetermined reference level, i.e., a voice signal is applied to the microphone 17 (FIG. 2) to start the conversation, the comparator 103 triggers the F/F 102 which in turn latches the positive voltage +V at the D terminal thereof to provide a high level signal at the Q terminal. This high level signal causes the analog switch 101 to be closed to thereby pass the output of signal detector 14 to the attenuation control circuit 13. Thereafter, the F/F 102 maintains this status until the disable signal is applied to the R terminal. When the analog switch 101 is closed, the voice-switched telephoning operates like the prior art speakerphone.

When the disable signal is applied to the R terminal of F/F 102, i.e., the established communications line is released, the F/F 102 makes the analog switch 101 open to stop the output of signal detector 14 from reaching the attenuation control circuit 13. Thus, the hands-free telephone returns to the waiting state.

FIG. 4 is a block diagram showing a second embodiment of the present invention which is applicable to a mobile telephone system. A mobile subscriber station (MSS) 31 comprises a radio transmitter/receiver (TRX) section 32, a logic section 33, a hands-free circuit 34, a speaker 35 and a microphone 36. Voice lines 40 and data lines 37 connect the radio section 32 and the logic section 33. Voice lines 38 and a data line 39 connect the logic section 33 and the hands-free circuit 34. In the waiting state and the call-up period, the hands-free circuit 34 passes a receive signal to the speaker 35 but not a transmit signal to the logic section 33. If a call is placed by MSS 31 and the called party responds to the call, the conversation begins therebetween.

The logic section 33 detects the begining of the conversation by detecting a billing signal which is transmitted from a telephone exchanger and will be described later in detail. Upon detection of the beginning of the conversation, logic section 33 provides a hands-free enable signal to the hands-free circuit 34. In response to the hands-free enable signal, the circuit 34 starts the voice-switched operation and continues this operation until the conversation ends. When the conversation ends, the logic section 33 provides a hands-free disable signal to the hands-free circuit 34 to return the circuit 34 to the waiting state.

In FIG. 5A, a mobile telephone system (MTS) includes a plurality of MSSs 41, a plurality of mobile base stations (MBSs) 42 and at least one mobile telephone control center (MTCC) 43. Only one of each of the MBS, MSS and MTCC are illustrated in FIG. 5A. MSS 41 and MBS 42 are to be connected with each other over a radio channel. MBS 42 and MTCC 43 are connected with each other through wired lines. MTCC 43 is also connected to an exchanger of PTSN through wired lines. PTSN includes a plurality of fixed subscriber station (FSSs) 45 which are connected to the exchanger through wired lines. The exchanger 44 comprises a tone oscillator generating a ringback tone.

If a call is originated by MSS 41 to FSS 45, MSS 41 is first connected to the exchanger through MBS 42 and MTCC 43. In this condition, the exchanger 44 sends a ringing signal to FSS 45 and a ringback to MSS 41. When FSS 45 goes off-hook, the exchanger 44 connects MSS 41 and FSS 45 for conversation. When either FSS 45 or MSS 41 goes on-hook, the exchanger 44 disconnects MSS 41 from FSS 45 and restores the used lines for other communications.

Since FSS 45 is connected to the exchanger 44 through a two-wire subscriber line while MTCC 43 is connected to the same through a four-wire line, the exchanger 44 has a hybrid transformer 441 for a four-wire to two-wire conversion or vis-a-vis, as shown in FIG. 5B. The hybrid transformer 441 is designed so that it has minimum coupling 171 between the speaker and microphone of the MSS when MSS 41 and FSS 45 are connected with each other. In other words, during a transient period from the call origination to the beginning of the conversation, the transformer 441 is unbalanced, causing the coupling 171 to be increased. This coupling increase leads to the singing at the MSS side. MSS 41 also has acoustic coupling 161 between the speaker and the microphone, which coupling worsens the singing problem. This singing problem can be eliminated with the MSS of FIG. 4.

Figure 8:
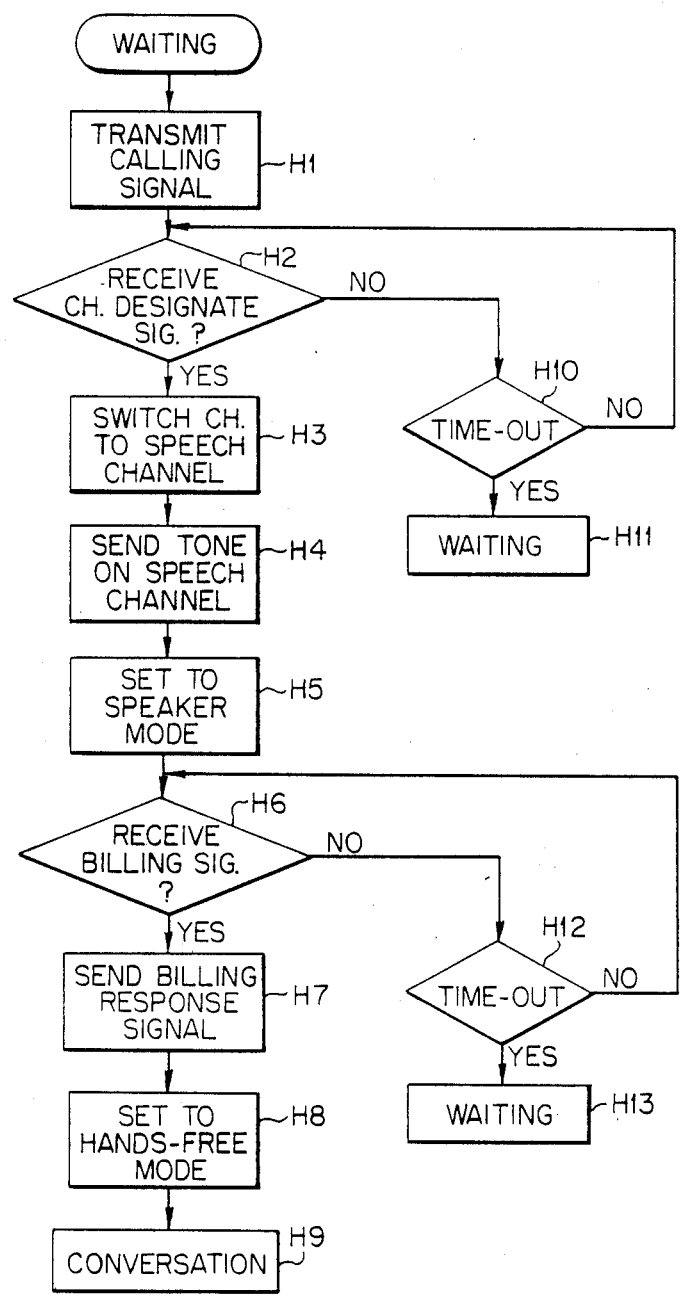
FIG. 8 is a flow chart showing operation of the hands-free telephone shown in FIG. 4.

More detailed description of the FIG. 4 MSS and of the FIGS. 5A and 5B MTS will now be provided with reference to FIGS. 6–8. FIG. 6 shows the operation flow of the prior art MTS for comparison with the present invention. In FIG. 6, when MBS receives a calling signal from an MSS (see step S1), MBS (of MTCC) transmits a speech or voice channel designate signal to MSS (step S2). Upon reception of the speech channel designate signal, MSS changes its channel to the designated speech channel and makes the receive and transmit voice gates (not shown) open to enter the hands-free (HF) operation or mode (step S10). Thereafter, the MSS transmits a channel-switch confirmation tone to the MBS/MTCC over the switched speech channel (step S3). In response to the tone, the MBS/MTCC sends a line connect request signal to the exchanger to thereby call a called party (step S4).

By receiving the line connect request signal, the exchanger sends a ringing signal to the called party and at the same time sends a ringback tone to MSS through the MBS/MTCC (step S5). If the called party goes off-hook, the exchanger sends an off-hook signal to the MBS/MTCC (step S6) to start the conversation. Since the MSS is in the HF mode when the ringback tone is being sent, i.e., the hybrid transformer in unbalanced, singing may occur at the MSS side. This situation continues for a period of time T1 until the ringback tone stops, i.e., the conversation starts.

FIG. 7 shows the operation flow of the present invention. In FIG. 7, steps S1 through S6 are the same operations as those of FIG. 6, except that the MSS makes only the receive voice gate open to enter a speaker (SP) operation or mode (step S13). Upon reception of the off-hook signal at step S6, the MBS/MTCC transmits a telephone billing signal to the MSS (step S7). In response to the billing signal, the MSS makes the transmit voice gate open to enter the HF mode and perform the voice-switched telephoning (step S10). At the same time, the MSS starts a billing operation and transmits a billing response signal to the MBS/MTCC (step S8) thus indicating the moment the call originator begins paying for the call.

When the ringback tone is being sent to the MSS, i.e., the hybrid transformer is unbalanced, the MSS is in the SP mode (see step S13). Thus, no singing will occur during this period of time T2. The MSS enters the HF mode only after the ringback tone stops, i.e., the hybrid transformer recovers to a well-balanced condition.

FIG. 8 shows the operation flow of the MSS of FIG. 4. After the MSS transmits a calling or call-up signal to the MBS/MTCC (step H1), the MSS waits for a channel designate signal at step H2. If the MSS receives no channel designate signal for a predetermined period of time, the MSS returns to the waiting state (steps H2, H10 and H11). If the MSS receives the channel designate signal at step H2, the MSS changes its channel to the designated speech channel (step H3). Then, the MSS sends a channel-switch confirmation signal over the switched speech channel (step H4) and enters the speaker (HP) mode (step H5).

After step H5, the MSS waits for a billing signal and if no billing signal is received for a predetermined period of time, the MSS returns to the waiting state (steps H6, H12 and H13). If the MSS receives the billing signal at step H6, the MSS proceeds to steps H7 and H8 to execute the transmission of billing response signal and the setting of hands-free (HF) mode. Thereafter, MSS starts the conversation (step H9).

As described hereinbefore, according to one aspect of the present invention, a hands-free telephone comprises an auxiliary control circuit which stops the output of a transmit voice signal detector from reaching the attenuation control circuit during a transient period between the call origination and the beginning of the conversation. Thus, by employing the auxiliary control circuit, the singing can be prevented during the transient period. In addition, according to another aspect of the present invention, a hands-free mobile subscriber telephone enables only a receive voice line during the transient period during which a ringback tone is being generated from a telephone exchanger, i.e., a hybrid transformer of the exchanger is unbalanced. The mobile subscriber telephone enters the hands-free operation only after the ringback tone stops or immediately before the conversation begins. Thus, the singing can also be prevented during the transient period.

What is claimed is:

1. A hands-free mobile subscriber station (MSS) used for a mobile telephone system which comprises at least one mobile base station (MBS) connected to said MSS over a radio channel and to an exchanger of a public telephone switching network, said MSS comprising:
   radio transmitter and receiver means;
   logic section means connected to said radio transmitter and receives means;
   speaker means;
   microphone means;
   hands-free circuit means connected to said logic section means, said speaker means and said microphone means for making voice-switched telephoning during conversation between said MSS and another party and for providing a receive signal from said logic section means to said speaker means and no transmit signal from said microphone means to said logic section means during a transient period between a call origination and the beginning of a conversation.

2. A hands-free MSS as claimed in claim 1, wherein said MBS includes means for sending a speech channel designate signal to said MSS in response to a call origination from said MSS, wherein said MSS changes, in response to said speech channel designate signal, its channel to a speech channel which is designated by said speech channel designate signal and sends a channel-switch confirmation tone to said MBS, wherein said hands-free circuit means provide, in response to said speech channel designate signal, a receive signal from said logic section means to said speaker means, wherein said MBS includes means for sending, in response to said channel-switch confirmation signal, a line connect request signal to said exchanger, wherein said exchanger includes means for sending, in response to said line connect request signal, a ringback tone to said MSS for sending, in response to an off-hook condition by another party, an off-hook signal to said MBS, wherein said MBS includes means for sending, in response to said off-hook signal, a billing signal to said MSS, and wherein said MSS includes means, in response to said billing signal, a billing response signal to said MBS and starts the voice-switched telephoning.

3. A method of controlling hands-free telephoning adapted to a mobile telephone system in which when a mobile subscriber station (MSS) places a call, a mobile base station (MBS) connects said MSS and a called party and when said called party responds to said call, said MBS transmits a conversation start signal to said MSS, said method comprising the following steps of:
  transmitting a speech channel designate signal from said MBS to said MSS;
  responsive to said speech channel designate signal, enabling a speaker of said MSS to output a ringback tone therethrough while disabling a microphone of said MSS;
  responsive to said conversation start signal, enabling said microphone to start the hands-free telephoning.

4. A method of controlling a hands-free mobile telephone which includes a speaker and a microphone, said method comprising the following steps of:
  transmitting a calling signal;
  checking if a channel designate signal is received;
  if said channel designate signal is not received, returning said telephone to a waiting state;
  if said channel designate signal is received, switching the channel of said telephone to a channel which is designated by said channel designate signal;
  transmitting a tone over the switched channel;
  responsive to the transmission of said tone, enabling said speaker;
  checking if a billing signal is received;
  if said billing signal is not received, returning said telephone to said waiting state;
  if said billing signal is received, transmitting a billing response signal and enabling said microphone; and
  responsive to the enabling of said microphone, performing voice-switched telephoning with respect to said speaker and microphone.

* * * * *